US008840786B2

United States Patent
Wechsler et al.

(10) Patent No.: US 8,840,786 B2
(45) Date of Patent: Sep. 23, 2014

(54) SYSTEM AND METHOD FOR REMOVING DISSOLVED CONTAMINANTS, PARTICULATE CONTAMINANTS, AND OIL CONTAMINANTS FROM INDUSTRIAL WASTE WATER

(75) Inventors: Ionel Wechsler, Framingham, MA (US); Peter G. Marston, Ipswich, MA (US)

(73) Assignee: Evoqua Water Technologies LLC, Alpharetta, GA (US)

(*) Notice: Subject to any disclaimer, the term of this patent is extended or adjusted under 35 U.S.C. 154(b) by 1151 days.

(21) Appl. No.: 12/008,209

(22) Filed: Jan. 9, 2008

(65) Prior Publication Data
US 2008/0210613 A1 Sep. 4, 2008

Related U.S. Application Data

(60) Provisional application No. 60/879,429, filed on Jan. 9, 2007.

(51) Int. Cl.
- B03D 1/14 (2006.01)
- B01D 35/06 (2006.01)
- B03C 1/30 (2006.01)
- C02F 1/48 (2006.01)
- C02F 1/24 (2006.01)
- B01D 17/04 (2006.01)
- C02F 9/00 (2006.01)
- B03D 1/02 (2006.01)
- C02F 1/40 (2006.01)
- C02F 1/72 (2006.01)

(52) U.S. Cl.
CPC ... C02F 1/24 (2013.01); C02F 9/00 (2013.01); C02F 1/40 (2013.01); C02F 1/722 (2013.01); C02F 1/488 (2013.01); C02F 2305/12 (2013.01); B03D 1/02 (2013.01); B03D 1/1431 (2013.01)

USPC ...... 210/221.1; 210/703; 210/708; 210/221.2; 210/695

(58) Field of Classification Search
USPC ............................................. 210/221.1, 221.2
See application file for complete search history.

(56) References Cited

U.S. PATENT DOCUMENTS

| 438,579 A | 10/1890 | Faunce et al. |
| 531,183 A | 12/1894 | Harris |

(Continued)

FOREIGN PATENT DOCUMENTS

| CN | 1686862 A | 10/2005 |
| CN | 101186410 A | 5/2008 |

(Continued)

OTHER PUBLICATIONS

Buchanan et al., "Aerobic Treatment of Wastewater and Aerobic Treatment Units," University Curriculum Development for Decentralized Wastewater Management Aerobic Treatment of Wastewater and Aerobic Treatment Units Buchanan and Seabloom, p. i-v and 1-22, Nov. 2004, [Retrieved on Mar. 9, 2011].

(Continued)

*Primary Examiner* — Benjamin Kurtz

(57) ABSTRACT

A system for removing dissolved contaminants, particulate contaminants, and oil contaminants from industrial waste water, the system including a gas floatation and primary oil contaminant removal subsystem including a tank for receiving a flow of the industrial waste water and a flow of gaseous microspheres, wherein the gaseous microspheres combine with oil droplets in the waste water to form flocs which float to the surface and are removed to provide processed waste water with the majority of the oil contaminants removed, and a contaminant removal subsystem for removing dissolved contaminants, particulate contaminants, and any remaining oil contaminants from the processed waste water.

25 Claims, 6 Drawing Sheets

(56) References Cited

U.S. PATENT DOCUMENTS

| | | |
|---|---|---|
| 653,010 A | 7/1900 | Koyl |
| 728,062 A | 5/1903 | Wilson |
| 1,064,807 A | 6/1913 | Yost |
| 1,310,461 A | 7/1919 | Williams |
| 1,383,287 A | 7/1921 | Campbell |
| 1,401,288 A | 12/1921 | Sodeau |
| 1,948,080 A | 2/1934 | Thomas |
| 2,065,123 A | 12/1936 | Downes |
| 2,129,267 A | 9/1938 | Fischer |
| 2,232,294 A | 2/1941 | Urbain et al. |
| 2,232,296 A | 2/1941 | Urbain et al. |
| 2,268,461 A | 12/1941 | Nichols |
| 2,326,575 A | 8/1943 | Stearns |
| 2,359,748 A | 10/1944 | Clemens |
| 2,391,494 A | 12/1945 | Walker |
| 2,401,924 A | 6/1946 | Goetz |
| 2,564,515 A | 8/1951 | Vogel |
| 2,597,561 A | 5/1952 | Blind |
| 2,652,925 A | 9/1953 | Vermeiren |
| 2,713,028 A | 7/1955 | Jenks |
| 2,758,715 A | 8/1956 | Fowler |
| 2,825,464 A | 3/1958 | Mack |
| 2,945,590 A | 7/1960 | Stearns |
| 3,066,095 A | 11/1962 | Hronas |
| 3,080,264 A | 3/1963 | Zimmie |
| 3,142,638 A | 7/1964 | Blaisdell et al. |
| 3,228,878 A | 1/1966 | Moody |
| 3,350,302 A | 10/1967 | Demeter et al. |
| 3,575,852 A | 4/1971 | Hughes |
| 3,617,561 A | 11/1971 | Fanselow |
| 3,622,461 A | 11/1971 | Wagner et al. |
| 3,627,678 A | 12/1971 | Marston et al. |
| 3,676,337 A | 7/1972 | Kolm |
| 3,690,454 A | 9/1972 | Bekhtle et al. |
| 3,693,795 A | 9/1972 | Robinson et al. |
| 3,697,420 A | 10/1972 | Blaisdell et al. |
| 3,767,351 A | 10/1973 | Blaser |
| 3,819,589 A | 6/1974 | Fauke et al. |
| 3,856,666 A | 12/1974 | Yashima et al. |
| 3,886,064 A | 5/1975 | Kosonen |
| 3,887,457 A | 6/1975 | Marston et al. |
| 3,920,543 A | 11/1975 | Marston et al. |
| 3,929,632 A | 12/1975 | Buriks et al. |
| 3,929,635 A | 12/1975 | Buriks et al. |
| 3,950,319 A | 4/1976 | Schmidt et al. |
| 3,951,807 A | 4/1976 | Sanderson |
| 3,959,133 A | 5/1976 | Fulton |
| 3,983,033 A | 9/1976 | de Latour |
| 4,024,040 A | 5/1977 | Phalangas et al. |
| 4,025,432 A | 5/1977 | Nolan et al. |
| 4,033,864 A | 7/1977 | Nolan et al. |
| 4,046,681 A | 9/1977 | Marston et al. |
| 4,066,991 A | 1/1978 | Marston et al. |
| 4,089,779 A | 5/1978 | Neal |
| 4,110,208 A | 8/1978 | Neal |
| 4,139,456 A | 2/1979 | Yabuuchi et al. |
| 4,142,970 A | 3/1979 | von Hagel et al. |
| 4,151,090 A | 4/1979 | Brigante |
| 4,153,559 A | 5/1979 | Sanderson |
| 4,167,480 A | 9/1979 | Mach |
| 4,176,042 A | 11/1979 | Fahlstrom |
| 4,190,539 A | 2/1980 | Besik |
| 4,193,866 A | 3/1980 | Slusarczuk et al. |
| 4,204,948 A | 5/1980 | Wechsler et al. |
| 4,274,968 A | 6/1981 | Grutsch et al. |
| 4,290,898 A | 9/1981 | von Hagel et al. |
| 4,297,484 A | 10/1981 | Quinlan |
| 4,320,012 A | 3/1982 | Palm et al. |
| 4,339,347 A | 7/1982 | Quinlan |
| 4,341,657 A | 7/1982 | Quinlan |
| 4,343,730 A | 8/1982 | Becker et al. |
| 4,357,237 A | 11/1982 | Sanderson |
| 4,358,382 A | 11/1982 | Quinlan |
| 4,359,382 A | 11/1982 | Morgan |
| 4,377,483 A | 3/1983 | Yamashita et al. |
| 4,388,195 A | 6/1983 | von Hagel et al. |
| 4,402,833 A | 9/1983 | Bennett et al. |
| 4,454,047 A | 6/1984 | Becker et al. |
| 4,465,597 A | 8/1984 | Herman et al. |
| 4,482,459 A | 11/1984 | Shiver |
| 4,502,958 A | 3/1985 | Sasaki |
| 4,522,643 A | 6/1985 | Quinlan |
| 4,563,286 A | 1/1986 | Johnson et al. |
| 4,579,655 A | 4/1986 | Louboutin et al. |
| 4,588,508 A | 5/1986 | Allenson et al. |
| 4,595,506 A | 6/1986 | Kneer |
| 4,626,354 A | 12/1986 | Hoffman et al. |
| 4,654,139 A | 3/1987 | Baba et al. |
| 4,655,933 A | 4/1987 | Johnson et al. |
| 4,686,035 A | 8/1987 | Estabrook |
| 4,689,154 A | 8/1987 | Zimberg |
| 4,699,951 A | 10/1987 | Allenson et al. |
| 4,735,725 A | 4/1988 | Reischl et al. |
| 4,752,401 A | 6/1988 | Bodenstein |
| 4,765,900 A | 8/1988 | Schwoyer et al. |
| 4,765,908 A | 8/1988 | Monick et al. |
| 4,783,265 A | 11/1988 | Timmons |
| 4,795,557 A | 1/1989 | Bourbigot et al. |
| 4,827,890 A | 5/1989 | Pociask et al. |
| 4,843,105 A | 6/1989 | Reischl et al. |
| 4,849,128 A | 7/1989 | Timmons et al. |
| 4,851,123 A * | 7/1989 | Mishra .................... 210/609 |
| 4,864,075 A | 9/1989 | Thompson et al. |
| 4,872,993 A | 10/1989 | Harrison |
| 4,874,508 A | 10/1989 | Fritz |
| 4,882,064 A | 11/1989 | Dixon et al. |
| 4,921,597 A | 5/1990 | Lurie |
| 4,921,613 A | 5/1990 | Nordberg et al. |
| 4,927,543 A | 5/1990 | Bablon et al. |
| 4,938,876 A | 7/1990 | Ohsol |
| 4,940,550 A | 7/1990 | Watson |
| 4,944,278 A | 7/1990 | Woodard |
| 4,944,279 A | 7/1990 | Woodard |
| 4,956,099 A | 9/1990 | Thompson et al. |
| 4,981,593 A | 1/1991 | Priestley et al. |
| 5,009,791 A | 4/1991 | Lin et al. |
| 5,013,451 A | 5/1991 | Thompson et al. |
| 5,019,274 A | 5/1991 | Thompson et al. |
| 5,023,012 A | 6/1991 | Buchan et al. |
| 5,026,483 A | 6/1991 | Thompson et al. |
| 5,055,194 A | 10/1991 | Goetz et al. |
| 5,064,531 A | 11/1991 | Wang et al. |
| 5,069,783 A | 12/1991 | Wang et al. |
| 5,084,733 A | 1/1992 | Katoh et al. |
| 5,089,120 A | 2/1992 | Eberhardt |
| 5,089,227 A | 2/1992 | Thompson et al. |
| 5,089,619 A | 2/1992 | Thompson et al. |
| 5,112,494 A | 5/1992 | Yan |
| 5,112,499 A | 5/1992 | Murray et al. |
| 5,149,438 A | 9/1992 | Hebert |
| 5,187,326 A | 2/1993 | Shirai |
| 5,234,603 A | 8/1993 | Potts |
| 5,266,200 A | 11/1993 | Reid |
| 5,298,168 A | 3/1994 | Guess |
| 5,310,642 A | 5/1994 | Vargas et al. |
| 5,369,072 A | 11/1994 | Benjamin et al. |
| 5,377,845 A | 1/1995 | Hamen et al. |
| 5,383,539 A | 1/1995 | Bair et al. |
| 5,395,527 A | 3/1995 | Desjardins |
| 5,397,476 A | 3/1995 | Bradbury et al. |
| 5,462,670 A | 10/1995 | Guess |
| 5,545,330 A | 8/1996 | Ehrlich |
| 5,560,493 A | 10/1996 | Perry |
| 5,593,590 A | 1/1997 | Steyskal |
| 5,595,666 A | 1/1997 | Kochen et al. |
| 5,596,392 A | 1/1997 | Danzuka |
| 5,597,479 A | 1/1997 | Johnson |
| 5,616,241 A | 4/1997 | Khudenko |
| 5,616,250 A | 4/1997 | Johnson et al. |
| 5,637,221 A * | 6/1997 | Coyne .................... 210/608 |
| 5,693,461 A | 12/1997 | Bagchi et al. |
| 5,702,809 A | 12/1997 | Tixier et al. |
| 5,730,864 A | 3/1998 | Delsalle et al. |
| 5,731,134 A | 3/1998 | Honan et al. |

(56) References Cited

U.S. PATENT DOCUMENTS

| | | |
|---|---|---|
| 5,770,091 A | 6/1998 | Binot et al. |
| 5,779,908 A | 7/1998 | Anderson et al. |
| 5,800,717 A | 9/1998 | Ramsay et al. |
| 5,805,965 A | 9/1998 | Tsuda et al. |
| 5,840,185 A | 11/1998 | Hughes et al. |
| 5,840,195 A | 11/1998 | Delsalle et al. |
| 5,856,072 A | 1/1999 | Leone et al. |
| 5,893,355 A | 4/1999 | Glover et al. |
| 5,925,290 A | 7/1999 | Hills |
| 5,976,375 A | 11/1999 | Dorica et al. |
| 5,976,771 A | 11/1999 | Kosugi et al. |
| 6,010,631 A | 1/2000 | Delsalle et al. |
| 6,030,761 A | 2/2000 | Taguchi et al. |
| 6,093,318 A | 7/2000 | Saho et al. |
| 6,099,738 A | 8/2000 | Wechsler et al. |
| 6,149,014 A | 11/2000 | Mankosa et al. |
| 6,151,467 A | 11/2000 | Yamaguchi |
| 6,160,976 A | 12/2000 | Karakama et al. |
| 6,185,393 B1 | 2/2001 | Karakama et al. |
| 6,210,587 B1 | 4/2001 | Vion |
| 6,210,588 B1 | 4/2001 | Vion |
| 6,221,253 B1 | 4/2001 | Fukase et al. |
| 6,221,262 B1 | 4/2001 | MacDonald et al. |
| 6,228,269 B1 | 5/2001 | Cort |
| 6,228,565 B1 | 5/2001 | Ohzeki et al. |
| 6,251,576 B1 | 6/2001 | Taguchi et al. |
| 6,277,285 B1 | 8/2001 | Vion |
| 6,290,849 B1 | 9/2001 | Rykaer et al. |
| 6,379,549 B1 | 4/2002 | LePoder et al. |
| 6,383,370 B1 | 5/2002 | Keever et al. |
| 6,386,781 B1 | 5/2002 | Gueret |
| 6,406,624 B1 | 6/2002 | DeVos |
| 6,423,485 B1 | 7/2002 | Yamada et al. |
| 6,432,303 B1 | 8/2002 | Chesner et al. |
| 6,447,686 B1 | 9/2002 | Choi et al. |
| 6,472,132 B1 | 10/2002 | Yamada et al. |
| 6,485,652 B1 | 11/2002 | Le Poder et al. |
| 6,517,714 B2 | 2/2003 | Streat |
| 6,613,232 B2 | 9/2003 | Chesner et al. |
| 6,645,386 B1 | 11/2003 | Moreau et al. |
| 6,689,277 B2 | 2/2004 | Streat |
| 6,692,173 B2 | 2/2004 | Gueret |
| 6,706,467 B2 | 3/2004 | Howe et al. |
| 6,740,245 B2 | 5/2004 | Johnson |
| 6,759,018 B1 | 7/2004 | Arno et al. |
| 6,783,679 B1 | 8/2004 | Rozich |
| 6,811,885 B1 | 11/2004 | Andriessen et al. |
| 6,824,692 B2 | 11/2004 | Binot et al. |
| 6,832,691 B2 | 12/2004 | Miles et al. |
| 6,875,351 B2 * | 4/2005 | Arnaud ................ 210/221.2 |
| 6,896,815 B2 | 5/2005 | Cort |
| 6,902,678 B2 | 6/2005 | Tipton |
| 6,919,031 B2 | 7/2005 | Blumenschein et al. |
| 6,923,901 B2 | 8/2005 | Leffler et al. |
| 6,960,294 B2 | 11/2005 | Arnaud |
| 6,966,993 B2 | 11/2005 | Binot |
| 6,968,138 B2 | 11/2005 | Akutsu |
| 7,001,525 B2 | 2/2006 | Binot et al. |
| 7,083,715 B2 | 8/2006 | Binot |
| 7,153,431 B2 | 12/2006 | Daugherty |
| 7,160,448 B2 | 1/2007 | Johnson |
| 7,210,581 B2 | 5/2007 | Robinson et al. |
| 7,244,362 B2 | 7/2007 | Binot |
| 7,255,793 B2 | 8/2007 | Cort |
| 7,276,165 B2 | 10/2007 | Morgoun |
| 7,309,435 B2 | 12/2007 | Rozich |
| 7,311,841 B2 | 12/2007 | Binot et al. |
| 7,323,108 B1 | 1/2008 | Garbett et al. |
| 7,407,582 B2 | 8/2008 | Sun |
| 7,407,593 B2 | 8/2008 | Frederick, Jr. et al. |
| 7,438,817 B2 | 10/2008 | Nagghappan et al. |
| 7,449,105 B2 | 11/2008 | Hastings |
| 7,476,324 B2 | 1/2009 | Ciampi et al. |
| 7,494,592 B2 | 2/2009 | Deskins |
| 7,563,366 B2 | 7/2009 | Sun |
| 7,601,261 B2 | 10/2009 | Palacios Donaque |
| 7,608,190 B1 | 10/2009 | Banerjee et al. |
| 7,625,490 B2 | 12/2009 | Cort |
| 7,648,637 B1 | 1/2010 | Sauvignet et al. |
| 7,648,638 B2 | 1/2010 | Essemiani et al. |
| 7,651,620 B2 | 1/2010 | Vion |
| 7,678,278 B2 | 3/2010 | Binot et al. |
| 7,686,079 B2 | 3/2010 | Gamache et al. |
| 7,686,960 B2 | 3/2010 | Cort |
| 7,691,261 B2 | 4/2010 | Deskins |
| 7,691,269 B2 | 4/2010 | Cort |
| 7,695,623 B2 | 4/2010 | Woodard et al. |
| 7,695,630 B2 | 4/2010 | de Guevara |
| 7,704,390 B2 | 4/2010 | Leffler et al. |
| 7,704,399 B2 | 4/2010 | Condit |
| 7,722,843 B1 | 5/2010 | Srinivasachar |
| 7,729,778 B2 | 6/2010 | Eggers et al. |
| 7,820,025 B2 | 10/2010 | Ciampi et al. |
| 7,820,053 B2 | 10/2010 | Cort |
| 7,820,054 B2 | 10/2010 | Hastings et al. |
| 7,828,976 B2 | 11/2010 | Banerjee et al. |
| 8,012,582 B2 | 9/2011 | Luo et al. |
| 8,470,172 B2 | 6/2013 | Woodard et al. |
| 8,506,800 B2 | 8/2013 | Woodard et al. |
| 8,540,877 B2 | 9/2013 | Woodard |
| 2001/0030160 A1 | 10/2001 | Wechsler et al. |
| 2002/0003115 A1 * | 1/2002 | Conaway et al. ........... 210/759 |
| 2002/0017483 A1 | 2/2002 | Chesner et al. |
| 2002/0030019 A1 | 3/2002 | Keever et al. |
| 2002/0054783 A1 | 5/2002 | Gueret |
| 2002/0088758 A1 | 7/2002 | Blumenschein et al. |
| 2002/0148780 A1 | 10/2002 | Tiemeyer |
| 2002/0158025 A1 | 10/2002 | Streat |
| 2002/0170816 A1 | 11/2002 | Leffler et al. |
| 2002/0185452 A1 | 12/2002 | Johnson |
| 2002/0190004 A1 | 12/2002 | Wechsler et al. |
| 2003/0082084 A1 | 5/2003 | Cort |
| 2003/0089667 A1 | 5/2003 | Binot et al. |
| 2003/0132160 A1 | 7/2003 | Khudenko |
| 2003/0150817 A1 | 8/2003 | Keever et al. |
| 2003/0222027 A1 | 12/2003 | Streat |
| 2003/0224301 A1 | 12/2003 | Howe et al. |
| 2004/0055959 A1 * | 3/2004 | Wechsler et al. ........... 210/695 |
| 2004/0055961 A1 | 3/2004 | Binot |
| 2004/0060876 A1 | 4/2004 | Tipton |
| 2004/0129642 A1 | 7/2004 | Binot |
| 2004/0144730 A1 | 7/2004 | Binot et al. |
| 2004/0149653 A1 | 8/2004 | Johnson et al. |
| 2004/0206680 A1 | 10/2004 | Johnson |
| 2004/0213721 A1 | 10/2004 | Arno et al. |
| 2005/0005471 A1 | 1/2005 | Pan |
| 2005/0035030 A1 | 2/2005 | Oder et al. |
| 2005/0045534 A1 | 3/2005 | Kin et al. |
| 2005/0051488 A1 | 3/2005 | Nagghappan et al. |
| 2005/0101719 A1 | 5/2005 | Ishihara |
| 2005/0103719 A1 | 5/2005 | Binot et al. |
| 2005/0131266 A1 | 6/2005 | Carman et al. |
| 2005/0173354 A1 | 8/2005 | Binot et al. |
| 2005/0194311 A1 | 9/2005 | Rozich |
| 2005/0218056 A1 | 10/2005 | Binot |
| 2005/0230299 A1 | 10/2005 | Saho et al. |
| 2005/0258103 A1 | 11/2005 | Cort |
| 2005/0271575 A1 | 12/2005 | Ciampi et al. |
| 2005/0277712 A1 | 12/2005 | Daly |
| 2005/0282144 A1 | 12/2005 | Wechsler et al. |
| 2006/0006114 A1 | 1/2006 | Deskins |
| 2006/0018273 A1 | 1/2006 | Yamada et al. |
| 2006/0108273 A1 | 5/2006 | Perri et al. |
| 2006/0108283 A1 | 5/2006 | Johnson et al. |
| 2006/0138047 A1 | 6/2006 | Morgoun |
| 2006/0175252 A1 | 8/2006 | Upendrakumar et al. |
| 2006/0186056 A1 | 8/2006 | Ivan |
| 2006/0213832 A1 | 9/2006 | Hudson et al. |
| 2006/0254770 A1 | 11/2006 | Hou |
| 2006/0270888 A1 | 11/2006 | Carman et al. |
| 2006/0289357 A1 | 12/2006 | Wechsler et al. |
| 2007/0039894 A1 | 2/2007 | Cort |
| 2007/0062883 A1 | 3/2007 | Frederick et al. |
| 2007/0108132 A1 | 5/2007 | de Guevara |

(56) References Cited

U.S. PATENT DOCUMENTS

| | | |
|---|---|---|
| 2007/0114184 A1 | 5/2007 | Essemiani et al. |
| 2007/0119776 A1 | 5/2007 | Isaka et al. |
| 2007/0138093 A1 | 6/2007 | Bossler et al. |
| 2007/0163955 A1 | 7/2007 | Sun |
| 2008/0019780 A1 | 1/2008 | Hastings |
| 2008/0073267 A1 | 3/2008 | Cort |
| 2008/0073268 A1 | 3/2008 | Cort |
| 2008/0073270 A1 | 3/2008 | Smith |
| 2008/0073271 A1 | 3/2008 | Cort |
| 2008/0073278 A1 | 3/2008 | Cort |
| 2008/0073279 A1 | 3/2008 | Cort |
| 2008/0073280 A1 | 3/2008 | Cort |
| 2008/0073281 A1 | 3/2008 | Cort |
| 2008/0073282 A1 | 3/2008 | Cort |
| 2008/0073283 A1 | 3/2008 | Cort |
| 2008/0073284 A1 | 3/2008 | Cort |
| 2008/0078721 A1 | 4/2008 | Binot et al. |
| 2008/0135491 A1 | 6/2008 | Cort |
| 2008/0156709 A1 | 7/2008 | Johnson |
| 2008/0164183 A1 | 7/2008 | Marston et al. |
| 2008/0164184 A1 | 7/2008 | Marston et al. |
| 2008/0203015 A1 | 8/2008 | Marston et al. |
| 2008/0217244 A1 | 9/2008 | Gaid |
| 2008/0257810 A1 | 10/2008 | Sun |
| 2008/0272065 A1 | 11/2008 | Johnson |
| 2008/0290030 A1 | 11/2008 | Nagghappan et al. |
| 2008/0296228 A1 | 12/2008 | Sauvignet et al. |
| 2008/0314820 A1 | 12/2008 | Prulhiere et al. |
| 2008/0314830 A1 | 12/2008 | Banerjee et al. |
| 2009/0047076 A1 | 2/2009 | Hastings |
| 2009/0050570 A1 | 2/2009 | Sauvignet |
| 2009/0065404 A1 | 3/2009 | Paspek, Jr. et al. |
| 2009/0084730 A1 | 4/2009 | Mabille et al. |
| 2009/0098262 A1 | 4/2009 | Mabille et al. |
| 2009/0127180 A1 | 5/2009 | Deskins |
| 2009/0178979 A1 | 7/2009 | Hastings et al. |
| 2009/0206040 A1 | 8/2009 | Berg et al. |
| 2009/0218281 A1 | 9/2009 | Sauvignet et al. |
| 2009/0261037 A1 | 10/2009 | Clifford, III et al. |
| 2009/0272693 A1 | 11/2009 | Mabille et al. |
| 2009/0299143 A1 | 12/2009 | Conlon et al. |
| 2009/0301948 A1 | 12/2009 | Essemiani et al. |
| 2009/0308815 A1 | 12/2009 | Sauvignet et al. |
| 2010/0038081 A1 | 2/2010 | Gamache et al. |
| 2010/0057085 A1 | 3/2010 | Holcomb et al. |
| 2010/0072142 A1 | 3/2010 | Lean et al. |
| 2010/0096335 A1 | 4/2010 | Sauvignet et al. |
| 2010/0101309 A1 | 4/2010 | Klyamkin et al. |
| 2010/0102006 A1 | 4/2010 | Quevillon |
| 2010/0155327 A1 | 6/2010 | Woodard et al. |
| 2010/0213123 A1 | 8/2010 | Marston et al. |
| 2010/0219372 A1 | 9/2010 | Hook et al. |
| 2010/0251571 A1 | 10/2010 | Woodard |
| 2010/0274209 A1 | 10/2010 | Roe et al. |
| 2011/0036771 A1 | 2/2011 | Woodard |
| 2011/0147304 A1 | 6/2011 | Sauvignet et al. |
| 2012/0067824 A1 | 3/2012 | Berg et al. |
| 2013/0020255 A1 | 1/2013 | Woodard |

FOREIGN PATENT DOCUMENTS

| | | |
|---|---|---|
| CN | 101244884 | 8/2008 |
| DE | 19600647 A1 | 7/1997 |
| EP | 12594 A1 | 6/1980 |
| EP | 0087223 A1 | 8/1983 |
| EP | 0139572 A1 | 5/1985 |
| EP | 266098 A2 | 5/1988 |
| EP | 392321 A1 | 10/1990 |
| EP | 392322 A1 | 10/1990 |
| EP | 1244601 B1 | 10/2002 |
| EP | 1785400 A1 | 5/2007 |
| EP | 2165980 A1 | 3/2010 |
| FR | 1411792 A | 9/1965 |
| FR | 2378550 A1 | 8/1978 |
| FR | 2719235 A1 | 11/1995 |
| JP | 07-299495 A | 11/1995 |
| JP | 08-257583 A | 10/1996 |
| JP | 11-169866 A | 6/1999 |
| JP | 2000-233198 A | 8/2000 |
| JP | 2001-170404 A | 6/2001 |
| JP | 2003-010874 A | 1/2003 |
| SU | 1136839 A1 | 1/1985 |
| WO | 9312041 A1 | 6/1993 |
| WO | 9735654 A1 | 10/1997 |
| WO | 9735655 A1 | 10/1997 |
| WO | 9803433 A1 | 1/1998 |
| WO | 9919261 A1 | 4/1999 |
| WO | 9931016 A1 | 6/1999 |
| WO | 0114260 A1 | 3/2001 |
| WO | 0128931 A1 | 4/2001 |
| WO | 0140121 A1 | 6/2001 |
| WO | 0200556 A1 | 1/2002 |
| WO | 0242223 A1 | 5/2002 |
| WO | 2005077835 A1 | 8/2005 |
| WO | 2005087385 A1 | 9/2005 |
| WO | 2006086384 A2 | 8/2006 |
| WO | 2006102362 A2 | 9/2006 |
| WO | 2007059141 A2 | 5/2007 |
| WO | 2007098298 A2 | 8/2007 |
| WO | 2008022192 A2 | 2/2008 |
| WO | 2008039711 A2 | 4/2008 |
| WO | 2008039936 A2 | 4/2008 |
| WO | 2008085196 A2 | 7/2008 |
| WO | 2008085197 A1 | 7/2008 |
| WO | 2008086009 A1 | 7/2008 |
| WO | 2008086010 A1 | 7/2008 |
| WO | 2009083346 A1 | 7/2009 |
| WO | 2010027895 A2 | 3/2010 |
| WO | 2010081903 A1 | 7/2010 |
| WO | 2010086249 A1 | 8/2010 |

OTHER PUBLICATIONS

Catlow et al. "Ballasted Biological Treatment Process Removes Nutrients and Doubles Plant Capacity". WEFTEC Conference. Date Unkown.

Kolm et al., "High Gradient Magnetic Separation," Scientific American, Nov. 1975, vol. 233, No. 5, 10 pages (unnumbered).

Lubenow et al. "Maximizing Nutrient Removal in an Existing SBR with a Full-Scale BioMag Demonstration". WEFTEC Conference. Date Unknown.

Moody et al. "Beyond Desktop Evaluation: Key Design Criteria for Mixing and Settling of Magnetite-Impregnated Mixed Liquor". WEFTEC Conference 2011.

Raskin et al., "Quantification of Methanogenic Groups in Anaerobic Biological Reactors by Oligonucleotide Probe Hybridization," Applied and Environmental Microbiology, Apr. 1994, vol. 60, No. 4, pp. 1241-1248.

Sakai et al., "A Sewage Treatment Process Using Highly Condensed Activated Sludge with an Apparatus for Magnetic Separation," 1994, Journal of Fermentation and Bioengineering, vol. 78, No. 1, pp. 120-122.

Sakai et al., "Magnetic Forced Sedimentation of Flocs in Activated Sludge Supplemented with Ferromagnetic Powder of Iron Oxide," 1991, Journal of Fermentation and Bioengineering, vol. 71, No. 3, pp. 208-210.

Sakai et al., "Recovery and Reuse of Ferromagnetic Powder Supplemented in Activated Sludge for Magnetic Separation," Dept. of Applied Chemistry, Faculty of Engineering, Utsunomiya University, Japan, Submitted: Jun. 28, 1991; Accepted: Oct. 22, 1991, pp. 1-11. Japanese language original (pp. 52-56), and translated English language copy (pp. 1-11).

Sakai et al., "Sewage Treatment under Conditions of Balancing Microbial Growth and Cell Decay with a High Concentration of Activated Sludge Supplemented with Ferromagnetic Powder," 1992, Journal of Fermentation and Bioengineering, vol. 74, No. 6, pp. 413-315.

(56) References Cited

OTHER PUBLICATIONS

Sakai et al., "Simultaneous Removal of Organic and Nitrogen Compounds in Intermittently Aerated Activated Sludge Process Using Magnetic Separation," 1997, Technical Note Wat. Res., vol. 31, No. 8, pp. 2113-2116.

http://www.envirosim.com/includes/weftec08.htm, downloaded Dec. 16, 2012.

Tozer, "Study of Five Phosphorus Removal Processes," The Georgia Operator, vol. 45, No. (Winter 2008).

www.ingentaconnect.com/content/wef/wefproc/2009/00002009/00000004/art0020, downloaded Dec. 16, 2012.

* cited by examiner

SYSTEM AND METHOD FOR REMOVING DISSOLVED CONTAMINANTS, PARTICULATE CONTAMINANTS, AND OIL CONTAMINANTS FROM INDUSTRIAL WASTE WATER

RELATED APPLICATIONS

This application claims priority of and benefit to provisional patent application Ser. No. 60/879,429, filed Jan. 9, 2007, incorporated by reference herein.

FIELD OF THE INVENTION

This invention relates to a system and method for removing dissolved contaminants, particulate contaminants and oil contaminants from industrial waste water.

BACKGROUND OF THE INVENTION

The oil industry produces large amounts of waste water during exploration and production of petroleum. It has been estimated that approximately 800 gallons of water are used for the production of a barrel of oil of which approximately 80% is used for cooling in the refinery process. Oil wastes are classified depending on their origin, e.g., from oil production or from oil refining. Waste water from oil production is generally a mixture of drilling muds, salt water, free and emulsified oil and natural gas. Waste water from oil refineries includes, inter alia, free and emulsified oils from leaks, spills, and other sources. The combined refinery wastes or spills may contain crude oil and various fractions thereof, dissolved or suspended mineral and organic compounds discharged in liquors and sludges in various stages of processing.

Cleaning of industrial waste water from oil production and oil refining is important for both environmental and industry purposes. There are many conventional processes for cleaning oil industrial waste water which include, for example, gravity separation, floatation, filtration, chemical treatments, electrochemical treatments, biochemical treatments, and the like. These systems are typically large, inefficient, and expensive to operate. The only known process which can achieve a final effluent with less than 5 p.p.m. oil contaminants is membrane filtration. However, membrane filtration is expensive and difficult to operate because the membranes quickly foul.

BRIEF SUMMARY OF THE INVENTION

It is therefore an object of this invention to provide a system and method for removing dissolved contaminants, particulate contaminants, and oil contaminants from industrial waste water.

It is a further object of this invention to provide such a system and method which removes dissolved contaminants, particulate contaminants, and oil contaminants from industrial waste water generated by oil production and oil refining processes.

It is a further object of this invention to provide such a system and method which removes dissolved contaminants, particulate contaminants, and oil contaminants from industrial waste water to an acceptable level required by the Environmental Protection Agency (EPA).

It is a further object of this invention to provide such a system and method which produces a final effluent which can be reused by oil production and oil refining processes.

It is a further object of this invention to provide such a system and method which provides a final effluent with less than 5 p.p.m. of oil contaminants.

It is a further object of this invention to provide such a system and method which provides a final effluent with less than 5 p.p.m. of particulate contaminants.

It is a further object of this invention to provide such a system and method which utilizes less space.

It is a further object of this invention to provide such a system and method which eliminates the problems associated with using membranes.

It is a further object of this invention to provide such a system and method which reduces costs.

It is a further object of this invention to provide such a system and method which recycles weighting agents.

It is a further object of this invention to provide such a system and method which is more effective.

The subject invention, however, in other embodiments, need not achieve all these objectives and the claims hereof should not be limited to structures or methods capable of achieving these objectives.

This invention features a system for removing dissolved contaminants, particulate contaminants, and oil contaminants from industrial waste water, the system including a gas floatation and primary oil contaminant removal subsystem including a tank for receiving a flow of the industrial waste water and a flow of gaseous microspheres, wherein the gaseous microspheres combine with oil droplets in the waste water to form flocs which float to the surface and are removed to provide processed waste water with the majority of the oil contaminants removed, and a contaminant removal subsystem for removing dissolved contaminants, particulate contaminants, and any remaining oil contaminants from the processed waste water.

In a preferred embodiment, the gas floatation and primary oil contaminant removal subsystem may further include a floc removal subsystem for removing the flocs from the surface of the waste water. The subsystem may include a skimmer. The system may include a cooling subsystem for reducing the temperature of the waste water to an appropriate temperature for use with a desired flocculant. The system may further include a buffer tank for regulating the flow of waste water and removing coarse particulates in the waste water. The contaminant removal subsystem may include a coagulation mixing tank for receiving the processed waste water and introducing and mixing a coagulant with the processed waste water to precipitate the dissolved contaminants and form flocs of the precipitated dissolved contaminants and of the particulate contaminants. The system may further include a weighting agent mixing tank for receiving the processed waste water from the coagulation mixing tank and introducing and mixing a weighting agent with the processed waste water. The system may further include a flocculation subsystem for receiving the processed waste water from the weighting agent mixing tank and introducing and mixing a flocculant to form large flocs of the weighting agent and the microflocs of the particulate contaminants and/or large flocs of the weighting agent and the precipitated dissolved contaminants and/or large flocs of the weighting agent and any remaining oil particulates and/or large flocs of the weighting agent and any other particulates present in the waste water. The system may further include a separation subsystem for separating the large flocs from the processed waste water to form a clear effluent. The system may further include an oxidation subsystem for introducing an oxidation agent to the processed waste water for changing the electrical charges on one or more of the particulate contaminants and/or the oil contaminants. Oxidation agent may include hydrogen peroxide. The weighting agent may include magnetite. The weighting agent may include coal fines. The separation subsystem may include a clarifier. The separation subsystem may include a rapid settler. The separation subsystem may include hydrocyclone. The system may further include a weighting agent recovery subsystem for recovering the weighting agent. The weighting agent recovery system may include a high shear mixer subsystem. The weighting agent recovery subsystem may include a high gradient magnetic filter for removing fine magnetized weighting agents from the clear effluent. The weighting agent recovery subsystem may include a wet drum magnetic separator. The system may further include a recycling subsystem for recycling the weighting agent to the weighting agent mixing tank. The system may further include a re-circulation system for re-circulating sludge formed from large flocs of the weighting agent and the microflocs of the particulate contaminants and/or large flocs of the weighting agent and the precipitated dissolved contaminants and/or large flocs of the weighting agent and any remaining oil particulates and/or large flocs of the weighting agent and any other particulates present in the waste water. The flocculation subsystem may include a static mixer and/or a mixing tank. The oxidation subsystem may include a static mixer. The separation subsystem may include a skimmer disposed inside the clarifier for coalescing the oil contained in the processed waste water and driving the coalesced oil particulates to the surface of the clarifier. The clear effluent may have less than about 5 p.p.m. of oil contaminants, dissolved contaminants, and particulate contaminants.

The invention may also feature a system for removing dissolved contaminants, particulate contaminants, and oil contaminants from industrial waste water, the system including a gas floatation and primary oil contaminate removal subsystem including a tank for receiving a flow of the industrial waste water and a flow of gaseous microspheres, wherein the gaseous microspheres combine with oil droplets in the waste water to form flocs which float to the surface and are removed to provide processed waste water with the majority of the oil contaminants removed, a cooling subsystem for reducing the temperature of the waste water to an appropriate temperature for use with a desired flocculent, and a contaminant removal subsystem for receiving the waste water from the gas floatation subsystem for removing dissolved contaminants, particulate contaminants, and any remaining oil contaminants from the processed waste water.

The invention further features a system for removing dissolved contaminants, particulate contaminants, and oil contaminants from industrial waste water, the system including a gas floatation and primary oil removal subsystem including a tank for receiving a flow of industrial waste water and a flow of gaseous microspheres, wherein the gaseous microspheres combine with oil droplets in the waste water to form flocs which float to the surface and are removed to provide processed waste water with the majority of the oil contaminants removed, a buffer tank for regulating the flow of oily waste water and removing coarse particulates in the waste water, and a contaminant removal subsystem for receiving the waste water from the gas floatation subsystem for removing dissolved contaminants, particulate contaminants, and any remaining oil contaminants from the processed waste water.

The invention further features a system for removing dissolved contaminants, particulate contaminants, and oil contaminants from industrial waste water, the system including a gas floatation and primary oil removal subsystem including a tank for receiving a flow of the industrial waste water and a flow of gaseous microspheres, wherein the gaseous microspheres combine with oil droplets in the waste water to form flocs which float to the surface and are removed to provide processed waste water with the majority of the oil contaminants removed, a cooling subsystem for reducing the temperature of the waste water to an appropriate temperature for use with a desired flocculant, a buffer tank for regulating the flow of waste water and removing coarse particulates in the oily waste water, and a contaminant removal subsystem for receiving the waste water from the gas floatation subsystem for removing dissolved contaminants, particulate contaminants, and any remaining oil contaminants from the processed waste water.

This invention further features a system for removing dissolved contaminants, particulate contaminants, and oil contaminants from industrial waste water, the system including a gas floatation and primary oil removal subsystem including a tank for receiving a flow of the industrial waste water and a flow of gaseous microspheres, wherein the gaseous microspheres combine with oil droplets in the waste water to form flocs which float to the surface and are removed to provide processed waste water with the majority of the oil contaminants removed, a cooling tank for reducing the temperature of the waste water to an appropriate temperature for use with a desired flocculant, a buffer tank for regulating the flow of waste water and removing coarse particulates in the oily waste water, and a contaminant removal subsystem for removing dissolved contaminants, particulate contaminants, and any remaining oil contaminants from the processed waste water. The contaminant removal subsystem includes a coagulation mixing tank for receiving the processed waste water and introducing and mixing a coagulant with the waste water to form microflocs of the particulate contaminants and to precipitate the dissolved contaminants. A weighting agent mixing tank receives the processed waste water from the coagulation mixing tank and introduces and mixing a weighting agent with the processed waste water, a flocculation mixing tank receives the processed waste water from the weighting agent mixing tank and introduces and mixes a flocculant to form large flocs of the weighting agent and the microflocs of the particulate contaminants and/or large flocs of the weighting agent and the precipitated dissolved contaminants and/or large flocs of the weighting agent and remaining oil particulates and/or large flocs of the weighting agent and any other particulates present in the waste water. A separation subsystem separates the large flocs from the processed waste water to form a clear effluent.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
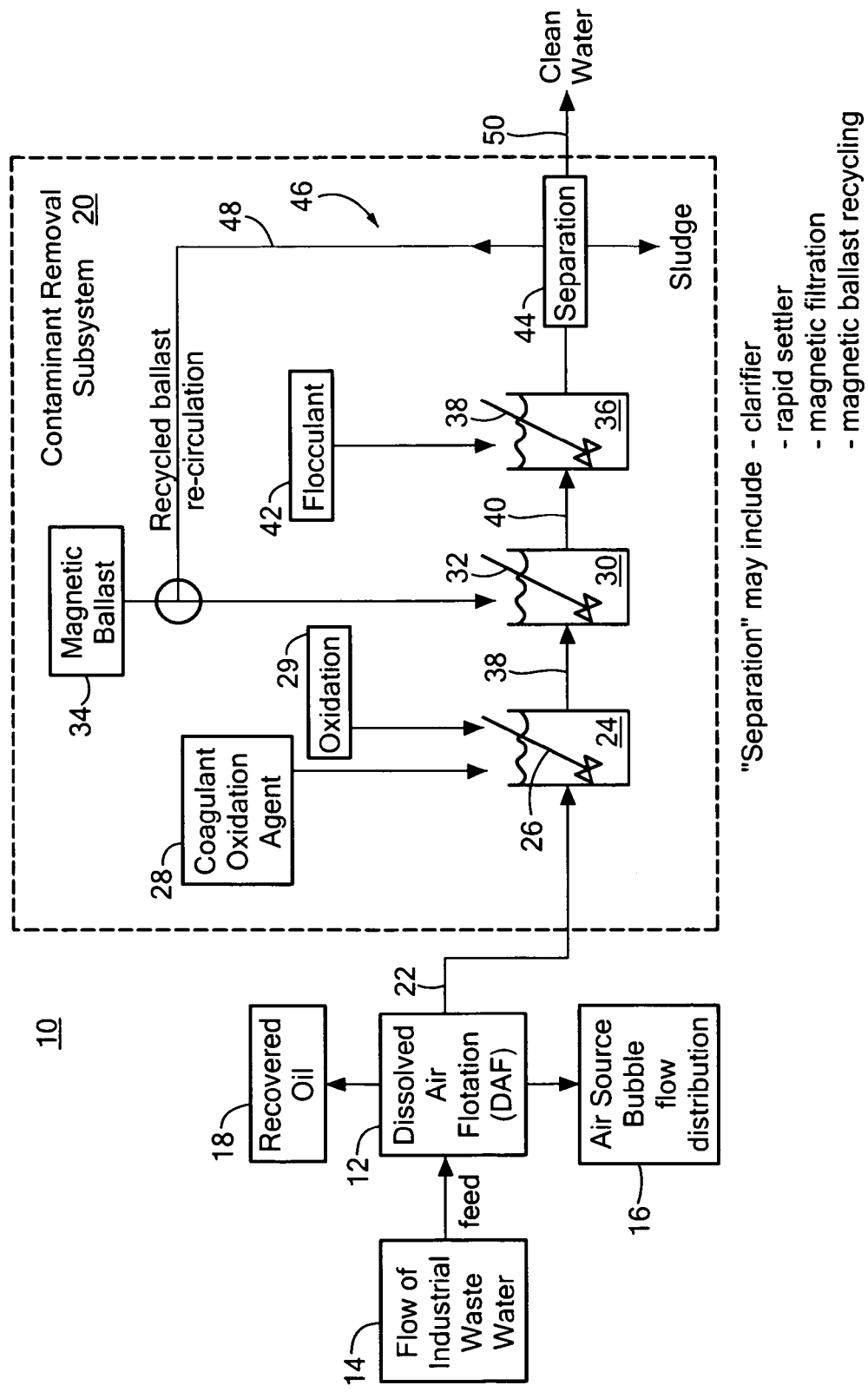
FIG. 1 is a schematic block diagram of one embodiment of the system for removing dissolved contaminants, particulate contaminants, and oil contaminants from industrial waste water of this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, conventional processes for cleaning oil industry waste water, such as gravity separation, floatation, filtration, chemical treatments, electrochemical treatments, biochemical treatments, and the like, are inefficient, large, expensive to operate, and typically incapable of producing a final effluent with less than 5 p.p.m. of oil and/or particulate contaminants. Although membrane filtration systems can produce a final effluent with less than 5 p.p.m. of oil contaminants, these systems are expensive and difficult to operate because the membrane filter quickly fouls.

In contrast, system 10, FIG. 1, for removing dissolved contaminants, particulate contaminants, and oil contaminants from industrial waste water of this invention includes gas floatation and primary oil contaminant removal subsystem 12 which receives flow of industrial waste water 14, e.g., from oil production processes, oil refining processes, and the like. Subsystem 12, e.g., a dissolved air floatation (DAF) subsystem, receives flow of gaseous microspheres 16, e.g., from an air source with a bubble flow distribution subsystem. The flow of gaseous microspheres 16 combines with oil droplets in flow of industrial wastewater 14 in subsystem 12.

When oil is in an emulsified state, it exists as a colloidal suspension. When oil is in a free state, it is present as micro-droplets. The micro-droplets, when suspended in waste water, possess negative charge surfaces which creates repulsive forces between the droplets. The gaseous microspheres from flow of gaseous microspheres 16 are positively charged and are attracted to the oil droplets. The interaction of gaseous microspheres 16 with the oil droplets in industrial waste water 14 forms flocs. The flocs of the oil micro-droplets and the gaseous microspheres float to the surface of the waste water and are removed as recovered oil 18, e.g., with a skimmer or similar type device. This removes the majority of oil contaminants from the industrial waste water and is output as processed waste water by line 22.

Contaminant removal subsystem 20 receives the processed waste water from subsystem 12 by line 22 and removes dissolved contaminants, particulate contaminants, and any remaining oil contaminants from the processed waste water by line 22 to provide a final clear effluent by line 50 which preferably has a concentration of oil contaminants, particulate contaminants, and dissolved contaminants which are less than about 5 p.p.m. each, as discussed in detail below.

In one embodiment, contaminant removal subsystem 20 includes coagulation mixing tank 24 with mixer 26 which receives the processed waste water from subsystem 12, by line 22 and introduces coagulant 28, e.g., aluminum, $FeCl_3$, PAC (polyaluminum chloride), and the like, to tank 24. Mixer 26 mixes the coagulant and the processed waste water to precipitate the dissolved contaminants in the waste water and form microflocs of precipitated dissolved contaminants and particulates.

Contaminant removal subsystem 20 also preferably includes weighting agent mixing tank 30 with mixer 32 which receives the processed waste water from coagulation mixing tank 24 by line 34 and introduces weighting agent or magnetic ballast 34, e.g., magnetite or similar type weighting agents known to those skilled in the art. Mixer 32 mixes the weighting agent 34 with the processed waste water in tank 30. As known by those skilled in the art, the weighting agent provides for rapid settling of flocs, as discussed below.

Subsystem 20 preferably includes flocculation mixing tank 36 which receives the processed waste water from weighting agent mixing tank 30 by line 40 and introduces flocculant 42. Mixer 38 mixes flocculant 42 with the processed waste water in tank 36 to form large flocs of the weighting agent and the microflocs of the particulate contaminants and/or large flocs of the weighting agent and the precipitated dissolved contaminants and/or large flocs of the weighting agent and any remaining oil particulates and/or large flocs of any other particulates present in the processed waste water received by line 40. The flocculant, e.g., a polymer, has an electrical charge (anionic or cationic) which attracts the weighting agent, the microflocs of the particulate contaminants, the precipitated dissolved contaminants, any remaining oil particulates, and any other particulates present in the waste water to form the large flocs which are separated using separation subsystem 44. The weighting agent provides for rapid settling of the flocs separation subsystem 44.

Separation subsystem 44 separates the large flocs of the weighting agent and the microflocs of the particulate, large flocs of the weighting agent and the precipitated dissolved contaminants and/or large flocs of the weighting agent and any remaining oil particulates and/or large flocs of any other particulates present in the processed waste water to provide a clear effluent on line 50, e.g., a final effluent having less than 5 p.p.m. each of oil contaminants, and particulate contaminants. As known to those skilled in the art, separation subsystem 44 may include a clarifier, a rapid settler, or a hydrocyclone.

In one design, system 10 may include recycling and re-circulating subsystem 46 which recovers and recycles weighting agent or magnetic ballast 34 from the processed waste water in separation subsystem 40 by line 48 and also re-circulates the sludge of the large flocs of the weighting agent and contaminants by line 48 (discussed below).

In one embodiment, system 10 includes an oxidation subsystem 29 for introducing an oxidation agent, e.g., hydrogen peroxide or similar oxidation agent known to those skilled in the art, to the processed water in coagulation mixing tank 24 in order to change the electrical charges of one or more of the particulate contaminants and/or the oil contaminants in the waste water and to improve the formation of flocs. Additional examples of contaminant removal subsystem 20 are disclosed in U.S. Pat. No. 6,099,738 by the inventors hereof, incorporated by reference herein.

The result is system 10 for removing dissolved contaminants, particulate contaminants, and oil contaminants from industrial waste water of this invention effectively and efficiently removes dissolved contaminants, particulate contaminants, and oil contaminants from industrial waste water. e.g., generated from oil production and/or oil refining processes.

System 10 provides a final clean effluent, preferably having a level of oil contaminants and particulate contaminants less than about 5 p.p.m. each. Such a level is an acceptable level required by the EPA and can be reused by oil production and/or oil refining processes. Moreover, system 10 does not require the use of any membranes or filters, thus the problems associated therewith are eliminated. System 10 is less expensive and utilizes less space than conventional industrial waste water cleaning systems. The ability to recycle the weight agents further decreases processing costs.

Figure 2:
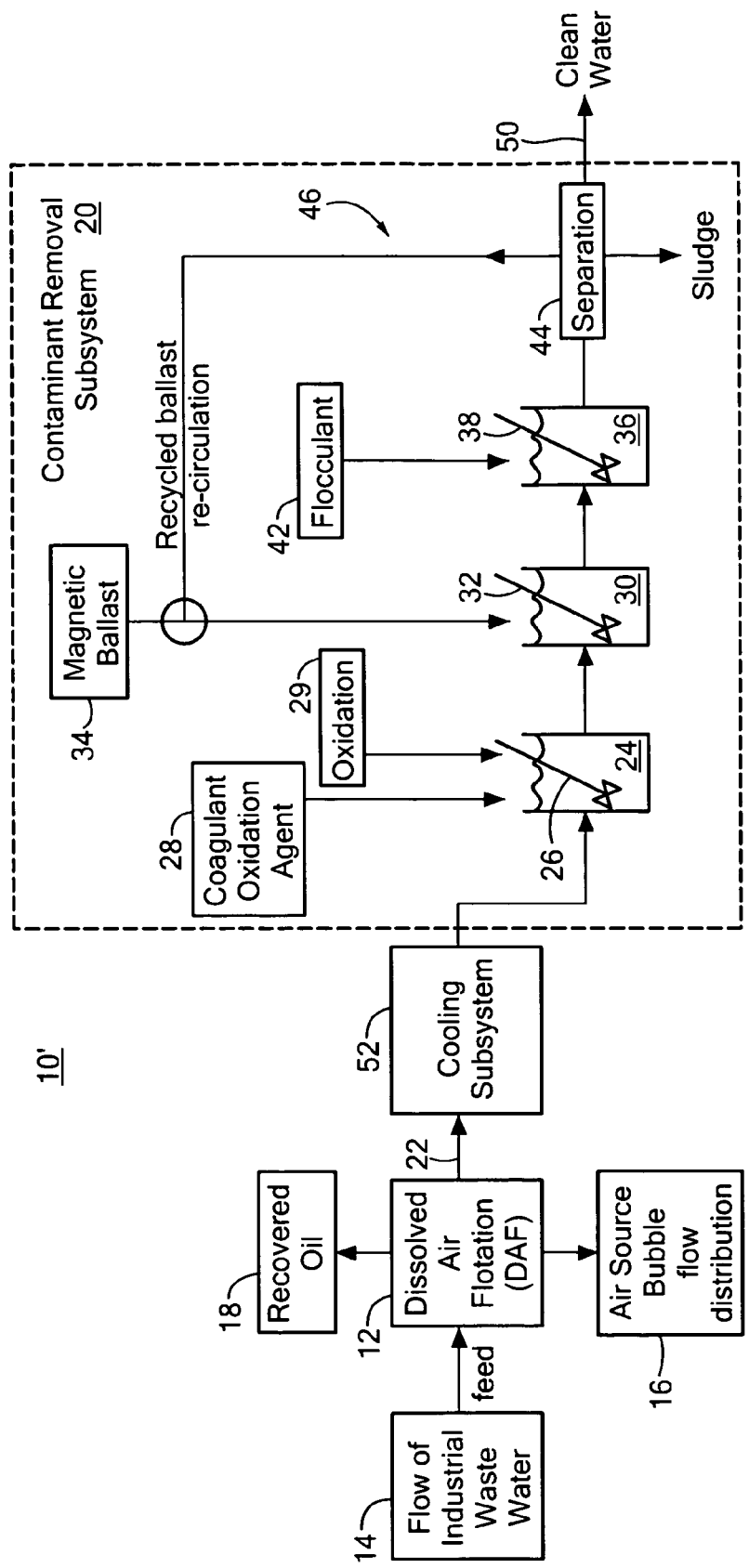
FIG. 2 is a schematic block diagram of the system shown in FIG. 1 incorporating a cooling subsystem in accordance with one embodiment of this invention.

In one embodiment, system 10', FIG. 2, where like parts have been given like numbers, includes cooling subsystem 52. Cooling subsystem 52 reduces the temperature of the waste water received from gas floatation and primary oil contaminant removal subsystem 12 by line 22 to an appropriate temperature on line 23, e.g., about 50° C., for use with a desired flocculant, e.g., a polymer such as Cytec A-130 or similar flocculant type known by those skilled in the art.

Figure 3:
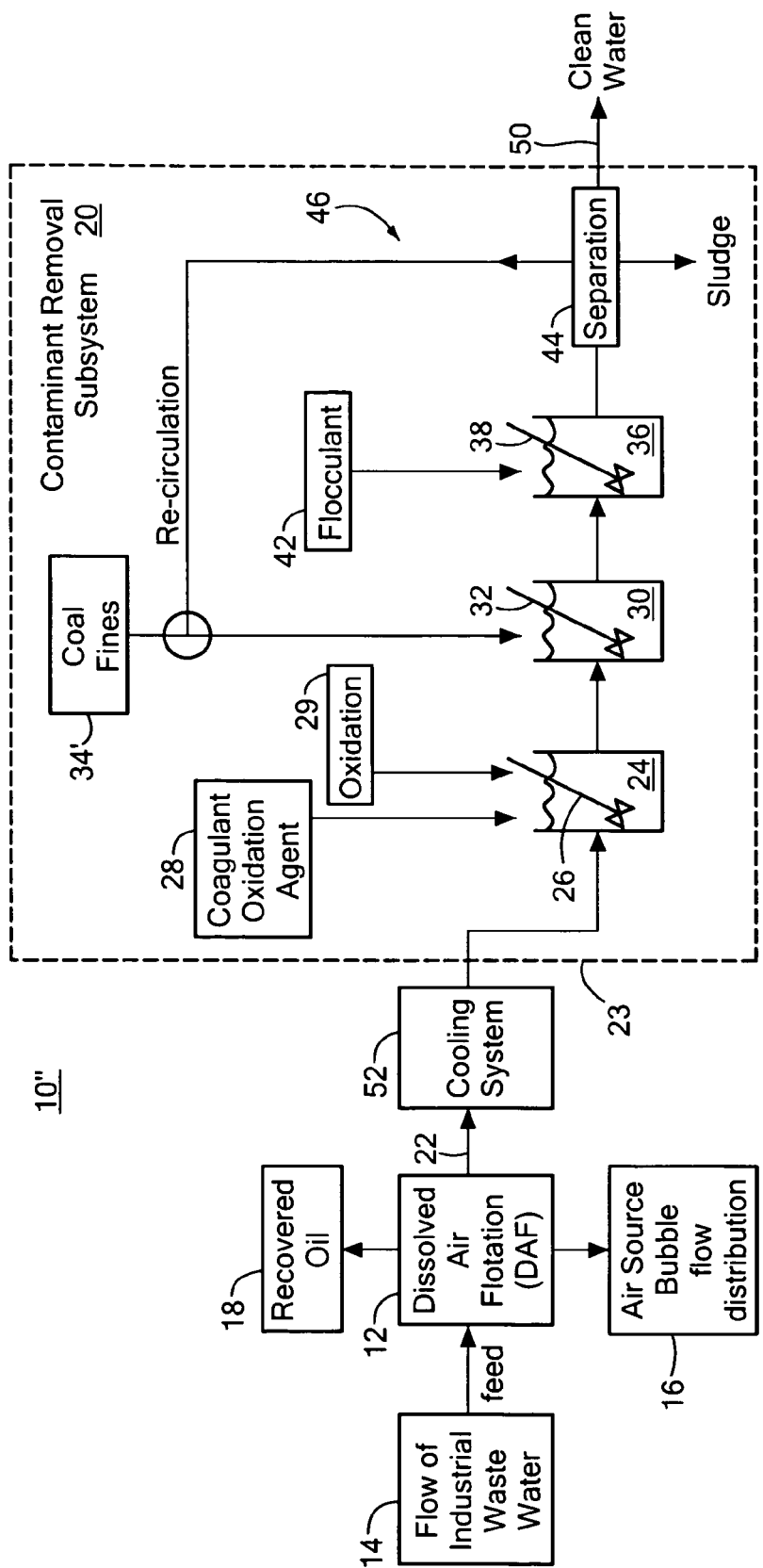
FIG. 3 is a schematic block diagram of another embodiment of the system shown in FIG. 2 utilizing coal fines as a weighting agent in accordance with this invention.

In one design, weighting agent 34', FIG. 3, where like parts have been given like numbers, may be coal fines. Using coal fines as the weighting agent generates a final sludge which can be filtered, dried, and used as a combustible.

Figure 4:
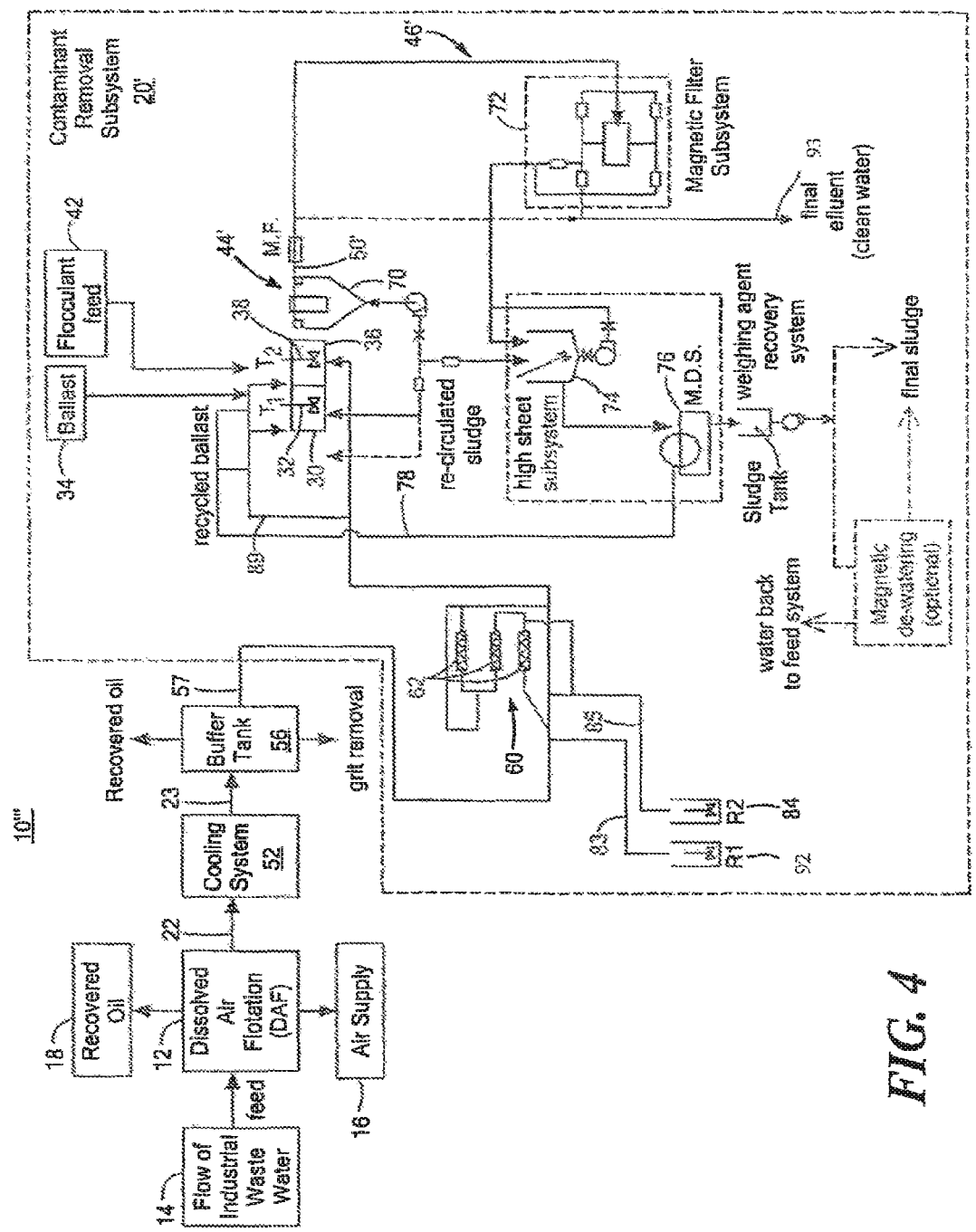
FIG. 4 is a schematic block diagram of another embodiment of the system shown in FIGS. 1-3 incorporating a buffer subsystem and also showing the primary components of one embodiment of the contaminant removal subsystem.

In another design, system 10''', FIG. 4, where like parts have been given like numbers, includes gas floatation and primary oil contaminant subsystem 12 which receives flow of industrial waste water 14 and operates similar as discussed above with reference to FIG. 1. System 10' also preferably includes buffer tank 56 which regulates the flow of waste water, e.g., from cooling subsystem 52 by line 23 and removes coarse particulates from the waste water. Although, as shown in FIG. 4 buffer tank 56 is located between cooling subsystem 52 and contaminant removal subsystem 20, this is not a necessary limitation of this invention, as buffer tank 56 may be located at any desired location in system 10.

In one design, contaminant removal subsystem 20' receives the cooled and regulated waste water from cooling subsystem 52 and buffer tank 56 by line 57. Static mixers 60 introduce and mix the coagulant via coagulant feed R1-92 by line 83 and/or the oxidation agent via oxidation feed R2-84 by line 85. The coagulant and/or oxidation agent interacts with plates 62 of static mixers 60 to effectively mix of the coagulant and/or the oxidizing agent with the processed waste water in line 57. The statically mixed coagulant and/or oxidizing agent with the processed waste water from subsystem 12 are fed into mixing tanks T-1 and T-2 by line 89. Tanks T-1 to T-2, e.g., weighting agent tank 30 with mixer 32 and flocculant mixing tank 36 with mixer 38 introduce and mix the waste water from static mixers 60 with weighting agents and flocculant to form large flocs of the weighting agent and the microflocs of particulate contaminants and/or large flocs of the weighting agent and the precipitated dissolved contaminants and/or large flocs of the weighting agent and any remaining oil particulates and/or large flocs of any other particulates present in the waste processed, similar as discussed above with reference to FIG. 1. Separation subsystem 44' includes clarifier 70 which removes the large flocs of the weighting agent and the microflocs of particulate contaminants, and/or the large flocs of the weighting agent and precipitated dissolved contaminants and/or large flocs weighting agent and any remaining oil particulates to provide a clear effluent on line 50', e.g., by rapid settling, as known by those skilled in the art.

In one design, contaminant removal subsystem 20' includes weighting agent recovery subsystem 46' for removing fine magnetized weighting agents from the clear effluent on line 50'. In one example, magnetic filter subsystem 72 and/or high shear subsystem 74 and/or magnetic wet drum separator 76 is used to remove and recover the weighting agent from the clear effluent in line 50'. Weighting agent recovery subsystem 70 recovers the weighting agent which is then recycled back to weighting agent mixing tanks, e.g., any of tank T-1 to T-2, by line 78. See, e.g., U.S. Pat. No. 6,099,738 cited supra.

Figure 5:
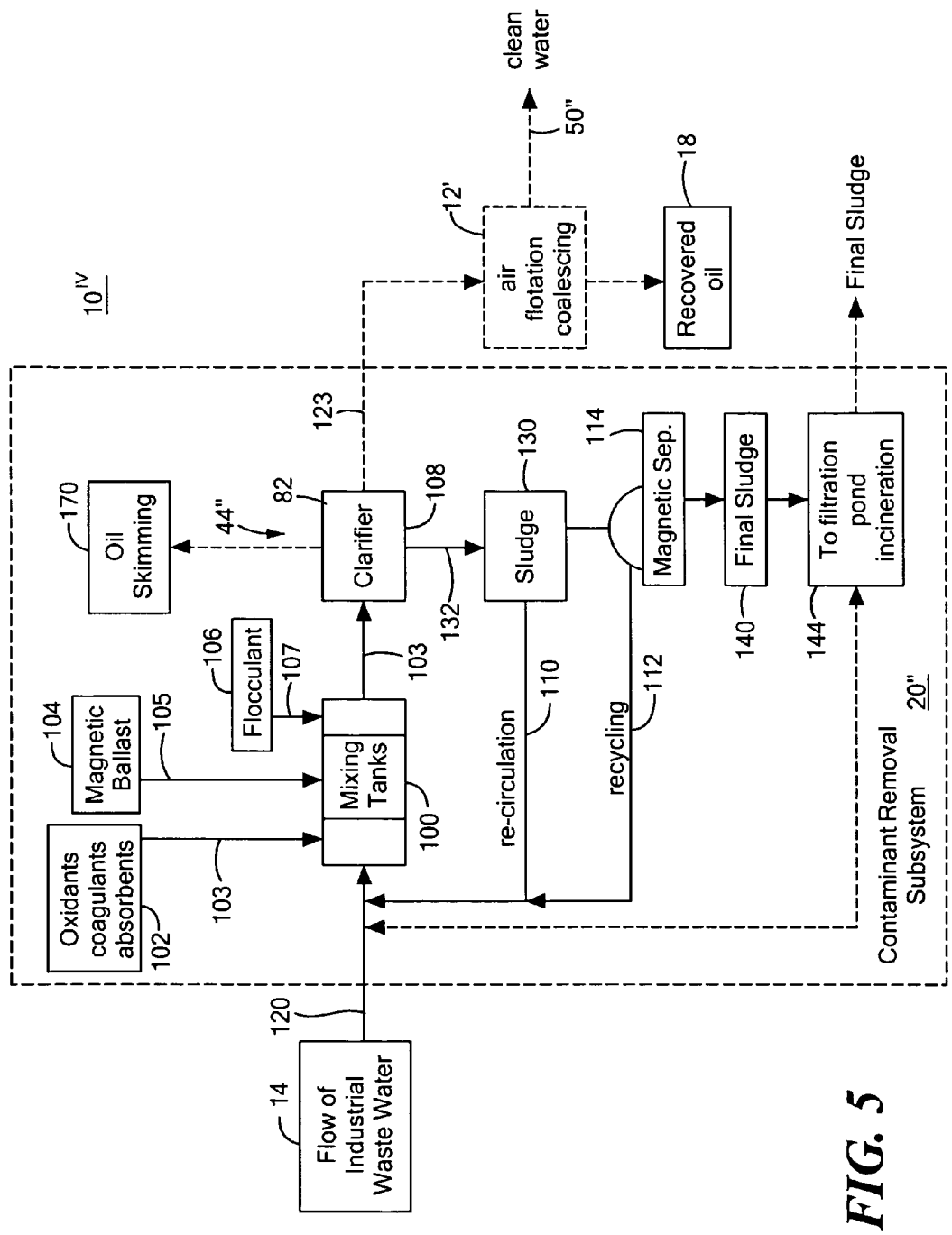
FIG. 5 is a schematic block diagram of yet another embodiment of the system for removing dissolved contaminants, particulate contaminants, and oil contaminants from industrial waste water of this invention.
Figure 6:
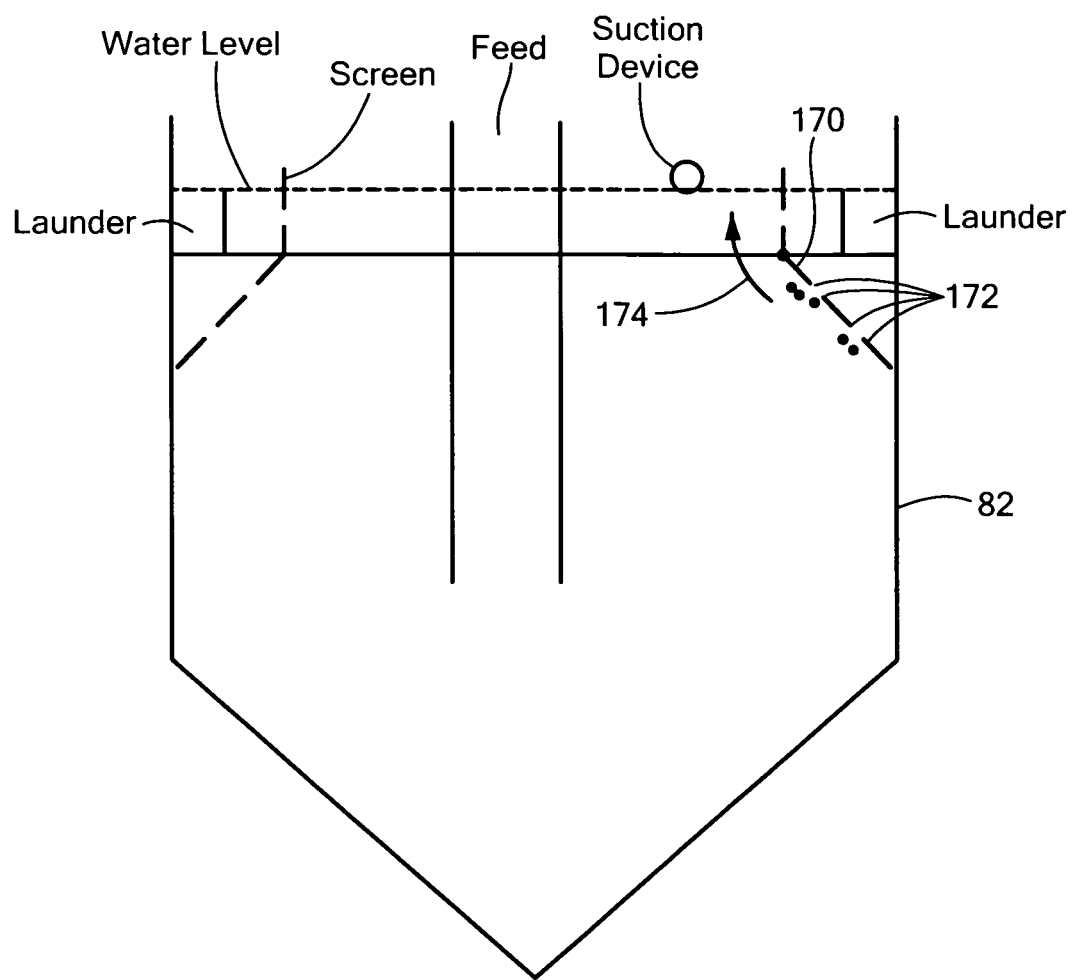
FIG. 6 is a schematic side view of one embodiment of a clarifier and oil skimmer that may be employed with the system shown in FIGS. 1-5.

Although, as discussed above with reference to FIGS. 1-4 above, gas floatation and primary oil contaminant removal subsystem 12 is located before contaminant removal subsystem 20, this is not a necessary limitation of this invention. In another embodiment, system $10^{iv}$, FIG. 5, where like parts have been given like numbers, for removing dissolved contaminants, particulate contaminants, and oil contaminants from industrial waste water of this invention, may include gas floatation and primary oil contaminants removal subsystem 12 located after contaminant removal subsystem 20". In this embodiment, contaminant removal subsystem 20" receives flow of industrial waste water 14 by line 120. Subsystem 20' includes tanks 100 which receive coagulants 102 by line 103, weighting agents or magnetic ballast 104 by line 105 and a flocculant 106 by line 107. Mixing tanks 100 operate similar to coagulation mixing tank 24 with mixer 24, weighting agent mixing tank 30 with mixer 32, and flocculation mixing tank 36 with mixer 38, as described above with reference to FIG. 1. The output of mixing tanks 100 by line 103 is large flocs of the weighting agent and oil contaminants, large flocs of the weighting agent, and the microflocs of the particulate contaminants, and/or large flocs of the weighting agent and the precipitated dissolved contaminants, and/or large flocs of any other particulates present in the waste water. Clarifier 82 preferably removes the large flocs by rapid sedimentation. Clarifier 82, FIG. 6, may also include skimmer 170, disposed inside clarifier 82, which coalesces the oil contained in the processed waste water, e.g., as shown at 172, and drives the coalesced oil particulates to the surface of the clarifier for removal as shown by arrow 174. Clarifier 82 with skimmer 170 may be utilized in any of the embodiments of system 10 discussed above with reference to FIGS. 1-4. Gas floatation and primary oil contaminant removal subsystem 12', FIG. 5, of similar design as gas floatation and primary oil contaminant removal subsystem discussed above with reference to FIG. 1, receives the clear effluent output by clarifier on line 123 and introduces gaseous microspheres which combine with any remaining oil droplets in the waste water to form flocs which float to the surface and are removed as recovered oil 18. The final clear effluent is output by line 50'''. Sludge 130 output by clarifier 82 by line 132 can the be re-circulated by line 110 to tanks 100 and/or processed by magnetic separator 114 which recycles the weighting agents by line 112 to mixing tanks 100. The final sludge 140 can be sent to filtration pond and incineration when the weighting agent is coal fines, indicated at 144. System $10^{iv}$ may also be combined with system 10, FIGS. 1-4, such that gas floatation and primary oil contaminant subsystem 12, 12', is located at before and after contaminant removal subsystem 20, 21'. Such a design is useful for applications requiring more complete removal of oil contaminants.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A system for removing dissolved contaminants, the contaminants comprising: particulate contaminants, emulsified oil contaminants, and micro-oil droplet contaminants from a refinery waste water, the system comprising:
   a gas floatation and primary oil contaminant removal subsystem comprising a tank having a processed water outlet, the tank connected to a source of the refinery waste water and a source of positively charged gaseous microspheres, the source of positively charged microspheres positioned to contact the free-oil contaminants in the refinery wastewater to form flocs of oil micro-droplets and gaseous microspheres in the tank;
   a floc removal subsystem positioned in the tank and having a skimmer positioned to remove the flocs of oil micro-droplets and gaseous microspheres from the tank to produce a processed water effluent; and
   a contaminant removal subsystem positioned downstream from, and in fluid communication with the processed water outlet of the gas floatation and primary oil contaminant removal subsystem, the contaminant removal subsystem comprising a source of a weighting agent positioned to contact at least the emulsified oil contaminants in the processed water to settle contaminants, the contaminant removal subsystem having an outlet constructed and arranged to provide a clarified water having less than about 5 ppm of at least one of oil contaminants and particulate contaminants without the use of any membranes or filters.

2. The system of claim 1 further comprising a cooling subsystem constructed and arranged to reduce a temperature of the waste water to a temperature for use with a flocculant.

3. The system of claim 1 further comprising a buffer tank constructed and arranged to regulate a flow of the waste water and to remove particulates in the waste water.

4. The system of claim 1 in which the contaminant removal subsystem comprises a coagulation mixing tank constructed and arranged to receive the processed waste water and connected to a source of a coagulant.

5. The system of claim 4 further comprising a weighting agent mixing tank connected to an outlet of the coagulation mixing tank and to the source of the weighting agent.

6. The system of claim 5 further comprising a flocculation subsystem connected to an outlet of the weighting agent mixing tank and to a source of a flocculant.

7. The system of claim 6 further comprising a separation subsystem.

8. The system of claim 4 further comprising an oxidation subsystem connected to a source of an oxidation agent and to the processed waste water.

9. The system of claim 8 in which the oxidation agent comprises hydrogen peroxide.

10. The system of claim 5 in which the weighting agent comprises magnetite.

11. The system of claim 5 in which the weighting agent comprises coal fines.

12. The system of claim 7 in which the separation subsystem comprises a clarifier.

13. The system of claim 7 in which the separation subsystem comprises a settler.

14. The system of claim 7 in which the separation subsystem comprises a hydrocyclone.

15. The system of claim 7 further comprising a weighting agent recovery subsystem having an inlet connected to the separation subsystem.

16. The system of claim 15 in which the weighting agent recovery system comprises a high shear mixer subsystem.

17. The system of claim 15 in which the weighting agent recovery subsystem comprises a high gradient magnetic filter.

18. The system of claim 15 in which the weighting agent recovery subsystem comprises a wet drum magnetic separator.

19. The system of claim 15 further comprising a recycling subsystem having an inlet connected to the weighting agent recovery subsystem and an outlet connected to the weighting agent mixing tank.

20. The system of claim 7 further comprising a re-circulation system having an inlet connected to the separation subsystem.

21. The system of claim 6 in which the flocculation subsystem comprises at least one of a static mixer and a mixing tank.

22. The system of claim 8 in which the oxidation subsystem comprises a static mixer.

23. The system of claim 7 in which the separation subsystem comprises a skimmer disposed inside of a clarifier.

24. A system for removing dissolved contaminants, particulate contaminants, emulsified oil contaminants, and free-oil contaminants from industrial waste water, the system comprising:
   a gas floatation and primary oil contaminant removal subsystem comprising a tank having a processed water outlet, the tank connected to a source of the industrial waste water and a source of positively charged gaseous microspheres, the source of positively charged microspheres positioned to contact the free-oil contaminants in the refinery wastewater to form flocs of oil micro-droplets and gaseous microspheres in the tank;
   a floc removal subsystem positioned in the tank and having a skimmer positioned to remove the flocs of oil micro-droplets and gaseous microspheres from the tank to produce a processed water effluent;
   a cooling subsystem constructed and arranged to reduce the temperature of the waste water to a temperature for use with a flocculent;
   a buffer tank constructed and arranged to regulate a flow of the waste water and to remove coarse particulates in the waste water;
   a contaminant removal subsystem positioned downstream from, and in fluid communication with the processed water effluent of the gas floatation and primary oil contaminant removal subsystem, the contaminant removal subsystem comprising a source of a weighting agent positioned to contact at least the emulsified oil contaminants and the remaining free oil contaminants in the processed water to settle contaminants, the contaminant removal subsystem constructed and arranged to provide a clarified water having less than about 5 ppm of at least one of oil contaminants and particulate contaminants without the use of any membranes or filters.

25. A system for removing dissolved contaminants, particulate contaminants, emulsified oil contaminants, and free-oil contaminants from waste water, the system comprising:
- a gas floatation and primary oil contaminant removal subsystem comprising a tank having a processed water outlet, the tank connected to a source of the industrial waste water and a source of positively charged gaseous microspheres, the source of positively charged microspheres positioned to contact the free-oil contaminants in the refinery wastewater to form flocs of oil micro-droplets and gaseous microspheres in the tank;
- a floc removal subsystem positioned in the tank and having a skimmer positioned to remove the flocs of oil micro-droplets and gaseous microspheres from the tank to produce a processed water effluent;
- a cooling tank constructed and arranged to reduce the temperature of the waste water to a temperature for use with a flocculent;
- a buffer tank constructed and arranged to regulate a flow of the waste water and to remove coarse particulates in the waste water; and
- a contaminant removal subsystem positioned downstream from, and in fluid communication with the processed water effluent of the gas floatation and primary oil contaminant removal subsystem, the contaminant removal subsystem comprising a source of a weighting agent positioned to contact at least the emulsified oil contaminants and the remaining free oil contaminants in the processed water to settle contaminants, the contaminant removal subsystem constructed and arranged to provide a clarified water, the contaminant removal subsystem comprising:
  - a coagulation mixing tank constructed and arranged to receive the processed waste water and to a source of a coagulant to provide microflocs of the particulate contaminants and to precipitate the dissolved contaminants;
  - a weighting agent mixing tank connected to an outlet of the coagulation mixing tank and to a source of a weighting agent;
  - a flocculation mixing tank connected to the weighting agent mixing tank and to a source of a flocculant; and
- a separation subsystem to provide a clear effluent having less than about 5 ppm each of at least one of oil contaminants and particulate contaminants without the use of any membranes or filters.

* * * * *